W. A. DARRAH.
CRUCIBLE AND METHOD OF MANUFACTURE.
APPLICATION FILED JAN. 3, 1918.
1,381,171.  Patented June 14, 1921.
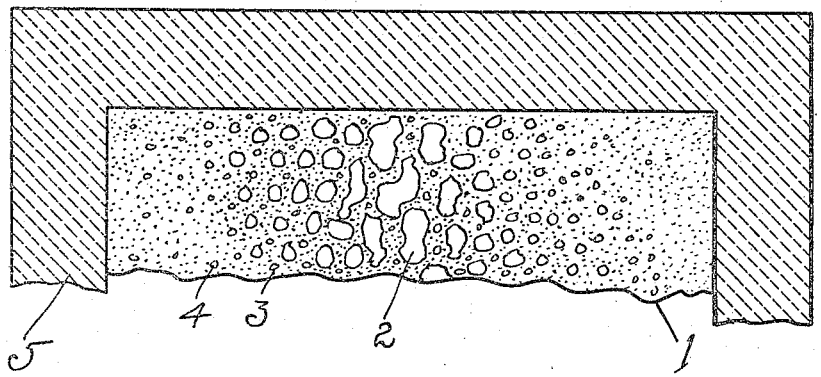
Figure I
Figure II
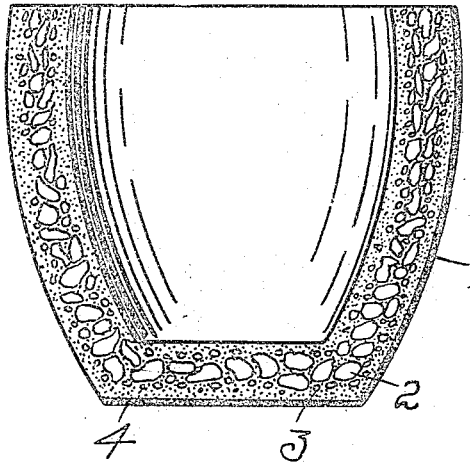
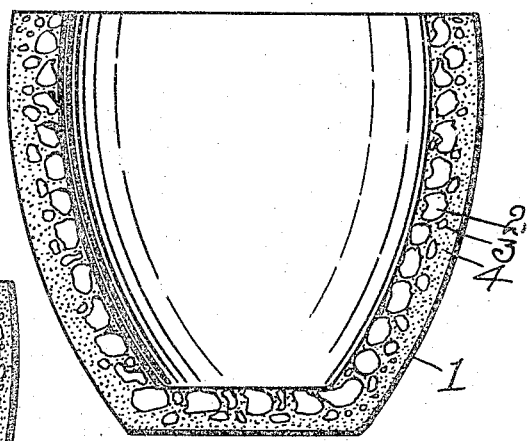
Figure III
William A. Darrah.
Inventor

UNITED STATES PATENT OFFICE.

WILLIAM A. DARRAH, OF MANSFIELD, OHIO.

CRUCIBLE AND METHOD OF MANUFACTURE.

1,381,171.    Specification of Letters Patent.    Patented June 14, 1921.

Application filed January 3, 1918. Serial No. 210,124.

*To all whom it may concern:*

Be it known that I, WILLIAM A. DARRAH, a citizen of the United States, residing at Mansfield, in the county of Richland and State of Ohio, have invented certain new and useful Improvements in Crucibles and Methods of Manufacture, of which the following is a specification.

In the course of many metallurgical operations it is necessary to have a supply of cheap and durable crucibles available of a type suitable for withstanding high temperature.

This invention relates to crucibles of this type and their method of manufacture.

By means of the process described in this application it is possible to cheaply produce crucibles which, by their structure, will be very durable and yet may be made in a very cheap manner.

The crucibles, or saggars, are formed most readily by the so-called casting process and this process as applied to crucibles and the result therefrom form a part of this invention.

The casting process consists in mixing a quantity of finely ground materials with an amount (approximately 25%) of suitable clay, as for example, Georgia fire clay, adding water until the mixture has the approximate consistency of cream and then pouring the entire mixture into a plaster of Paris mold where it is allowed to set for two or three hours during which time the water is absorbed leaving a plastic layer of clay which has the exact shape of the containing mold.

The mixture which I have found particularly effective in this connection is:

25 parts of coke crushed to pass through a 100 mesh sieve, 25 parts of coke crushed to pass through a quarter inch sieve, 25 parts of alumina crushed to pass through a 100 mesh sieve, or finer, 25 parts of fire clay.

The above is mixed with a sufficient quantity of water to render it fairly liquid and cast in the plaster of Paris mold in the desired shape.

It will be noted that the above mixture contains only 25% of fire clay and that since fire clay, as a rule, contains not more than thirty to forty per cent. silica, and usually less, the total quantity of silica in the above mixture is in the neighborhood of ten to fifteen per cent.

I have found that by the casting process the finer particles find their way to the surfaces next to the plaster of Paris, apparently carried there by the movement of the water in being absorbed by the walls of the mold. I find also that the mixture referred to above will give crucibles and containers which are lined with fine particles of carbon, alumina and the larger particles of carbon and alumina will form the interior or supporting material for the walls of the crucibles.

The silica is so uniformly distributed throughout the material that while there is only ten per cent. in the entire body, the quantity at the surface is only a small fraction of ten per cent. and is probably less than one or two per cent.

Referring to the drawing, Figure 1 shows, in section a portion of plastic material prepared by the method disclosed in this specification together with a section of a portion of the absorbent mold.

Fig. 2 shows a section of crucible produced by the process which forms the subject of this invention. Said crucible being cast in an absorbing mold having absorbent surfaces both within the crucible and surrounding its exterior.

Fig. 3 shows the section of the crucible formed by this process in which the absorbent mold surrounds the outside of the crucible only.

Referring to the figures, 1 indicates the plastic material; 2 indicates the larger refractory particles; 3 indicates the smaller particles and 4 indicates the fine conglomerate and 5 indicates a section of the absorbent mold.

Crucibles made in the manner here described are extremely cheap because of the small amount of labor involved and are particularly and peculiarly durable because of the absence of silica in their surface and the structure which puts the heat resisting and fire resisting materials on the outer surfaces where it is required. The heavier infusible materials which may also be made from the carborundum, fire clay, etc., are naturally placed in the center of the wall where they do not come into contact with the charge which is to be melted but do act in a very effective way to support the walls when heated. It is found from experience that the action of the liquid when absorbed by the porous mold naturally tends to cause the finer materials which are in suspension to move toward the walls of the porous mold, leaving the coarser materials in the center. It is this effect which may be used as described above to place the heavier, infusible materials in the center of the crucibles, leaving the finer material, which may be graphite, or any other substance desired on walls of the crucible. It will be apparent, therefore, that this allows the grading of the walls, both as to composition and size of particles. Since the finer materials always go to the surface of the absorbing molds, it is possible to compose the surface of any material which may be selected and, conversely, since the coarser materials remain in the center of the wall, it is possible to have the center or frame work composed of any desired materials.

The process which is here described is most effectively carried out with crucibles of this nature although it should be understood that it is not confined to these crucibles as substantially the same results can be obtained by pressed crucibles made from materials containing little or no silica. It is essential, of course, in dealing with manganese, brass, etc., that the silica in the walls be reduced to a minimum, however.

It should be understood, however, that the long life and high efficiency of crucibles made in this manner are decidedly advisable in carrying out my process.

It will be readily understood that after the crucibles have been used they will be destroyed and the walls and other portions could be reground and recast thus using the raw material practically indefinitely.

Having here described my invention, what I wish to secure by Letters Patent and claim as new is as follows:

1. The process of making crucibles which consists in mixing finely ground inert refractory, coarsely ground inert refractory and a colloidal binder, adding fluid until the mixture is liquid, pouring into a porous mold capable of absorbing said fluid and, after removing the mold, baking the product.

2. A cast crucible having a wall composed of finely ground refractory material on its surface, coarsely ground refractory in its interior, and a substantially uniform gradation in the size of the particles from the interior to the exterior.

3. A cast crucible having a wall composed of particles arranged according to size in a substantially uniform gradation from each surface toward the center.

4. A carbon walled cast crucible having the surface of its walls composed of fine particles of carbon and aluminum, the interior of its walls composed of larger particles of refractory materials and a substantially uniform gradation from the exterior to the interior.

5. A plastic body having a graduated and varying composition throughout the thickness of the wall, said composition varying with the size of the particles in the different portions of the wall.

6. A plastic body having a uniformly varying structure throughout its thickness, said structure varying in such a manner that the size of the particles are greatest in the center and least at the outside wall.

In testimony whereof I affix my signature.

WILLIAM A. DARRAH.